(12) United States Patent
Weng

(10) Patent No.: US 7,081,198 B2
(45) Date of Patent: Jul. 25, 2006

(54) AQUARIUM

(75) Inventor: Fu-Sheng Weng, Taichung Hsien (TW)

(73) Assignees: Fi-Sheng Weng, Taichung Hsien (TW); Rei-Fong Hsu, Taipei (TW)

( * ) Notice: Subject to any disclaimer, the term of this patent is extended or adjusted under 35 U.S.C. 154(b) by 56 days.

(21) Appl. No.: 11/020,212

(22) Filed: Dec. 27, 2004

(65) Prior Publication Data

US 2006/0138034 A1 Jun. 29, 2006

(51) Int. Cl.
*A01K 63/04* (2006.01)
*A01K 63/06* (2006.01)
*C02F 1/74* (2006.01)

(52) U.S. Cl. .................. 210/169; 210/198.1; 210/261; 210/416.2; 119/259; 119/263; 119/267

(58) Field of Classification Search ................ 210/169, 210/196, 198.1, 260, 261, 416.1, 416.2; 119/259–261, 119/263, 267; 222/196
See application file for complete search history.

(56) References Cited

U.S. PATENT DOCUMENTS

| | | | | |
|---|---|---|---|---|
| 3,324,829 A | * | 6/1967 | Dosamantes De Jose et al. | 119/262 |
| 3,418,973 A | * | 12/1968 | Saito | 119/226 |
| 3,994,807 A | * | 11/1976 | Macklem | 119/261 |
| 5,006,230 A | * | 4/1991 | Votava et al. | 210/94 |
| 5,469,810 A | * | 11/1995 | Chiang | 119/248 |
| 6,352,051 B1 | * | 3/2002 | Wang | 119/252 |
| 6,659,043 B1 | * | 12/2003 | Huska | 119/226 |
| 2006/0011529 A1 | * | 1/2006 | Chang | 210/169 |

FOREIGN PATENT DOCUMENTS

| | | | |
|---|---|---|---|
| JP | 9-271289 | * | 10/1997 |
| JP | 10-98978 | * | 4/1998 |

* cited by examiner

*Primary Examiner*—Fred G. Prince
(74) *Attorney, Agent, or Firm*—Bacon & Thomas

(57) ABSTRACT

An aquarium includes a bottom tank which has a pump circulate water via a first pipe and a first drainage pipe provided on top of the bottom tank to maintain water level in the bottom tank in a predetermined level, a middle tank mounted on top of the bottom tank and having a filtering box, a collecting pipe, a receiving box, a lid to cover the inlet of the collecting pipe and a funnel in communication with the lid via a conduit and a top tank having a filtering plate mounted on top of the bottom to cover the through hole and having multiple apertures, a top board to cover the top tank, an illuminating device to illuminate the top tank and a feeding device mounted on top of the top board for distributing food to fish in the top tank.

4 Claims, 4 Drawing Sheets

AQUARIUM

BACKGROUND OF THE INVENTION

1. Field of the Invention

The present invention relates to an aquarium, and more particularly to an aquarium having a bottom tank, a middle tank in communication with the bottom tank via a filtering tank and a top tank in communication with the middle tank via a filtering plate. A pump is provided inside the bottom tank so that water in the bottom tank is able to be circulated upward to the top tank where the fish are kept. Because the filtering assembly is provided under the top tank (the fish tank), the overall appearance and the cleanliness of the aquarium are maintained.

2. Description of Related Art

Aquariums are popular all over the world and bring a lot of pleasure to the owners. However, it is necessary to keep the aquarium in a very clean condition for the sake of the health of the fish, as well as making the aquarium attractive. In order to maintain the cleanliness of an aquarium, it is equipped with a filtering system to filter out organic waste from the fish which are kept in the aquarium. The filtering system is normally mounted on top of the aquarium and has a pump to circulate the water and to increase aeration of the water and a filtering board provided on the middle of the waterway of the filtering system so that when the water containing contaminants such as organic waste and microorganisms are able to be removed by the filtering board. However, the filtering board is easily blocked due to the accumulation of the contaminants after a period of time. Thus regular cleaning of the filtering board is necessary otherwise not only will the aquarium become polluted, the fish in the aquarium will become ill due to the contaminants in the water.

To overcome the shortcomings, the present invention tends to provide an improved aquarium to mitigate the aforementioned problems.

SUMMARY OF THE INVENTION

The primary objective of the present invention is to provide an aquarium having a bottom tank, a middle tank in communication with the bottom tank via a filtering tank and a top tank in communication with the middle tank via a filtering plate. A pump is provided inside the bottom tank so that water in the bottom tank is able to be circulated to the top tank where the fish are kept. Because the filtering assembly is provided under the top tank (the fish tank), the attractive overall appearance and the cleanliness of the aquarium are maintained.

Other objects, advantages and novel features of the invention will become more apparent from the following detailed description when taken in conjunction with the accompanying drawings.

DETAILED DESCRIPTION OF THE PREFERRED EMBODIMENT

Figure 1:
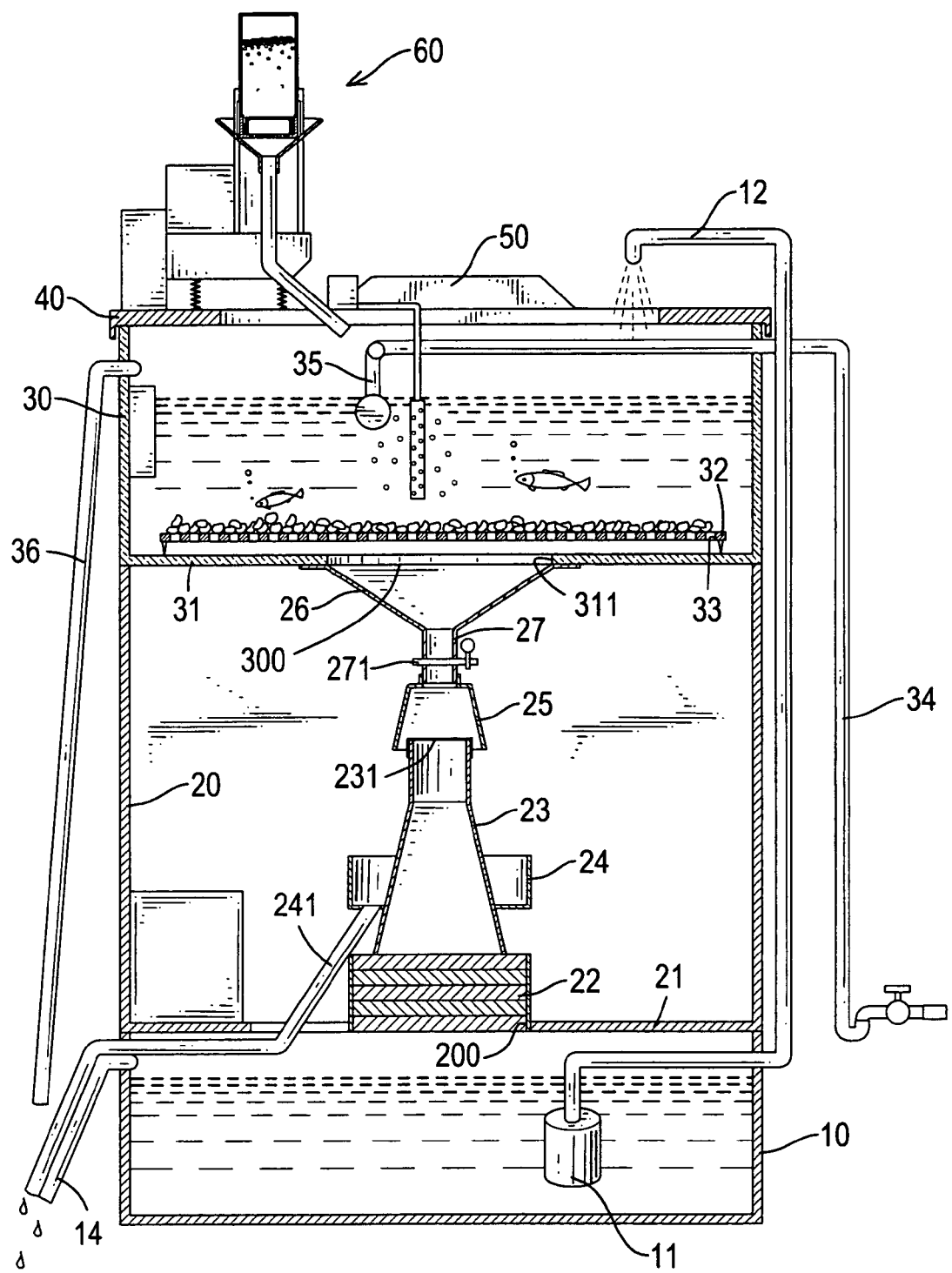
FIG. 1 is a schematic side plan view showing the structure of the present invention.

With reference to FIG. 1, the aquarium constructed in accordance with the present invention includes a bottom tank (10), a middle tank (20) mounted on top of the bottom tank (10) and a top tank (30) mounted on top of the middle tank (20).

The bottom tank (10) has a pump (11) provided therein so that water in the bottom tank (10) is able to be circulated to the top tank (30) via a first pipe (12) and water flowing out of the first pipe (12) and splashing into the top tank (30) is able to increase aeration of the water in the top tank (30). The bottom tank (10) has a first drainage pipe (14) provided on top of the bottom tank (10) to maintain a water level in the bottom tank (10) at a predetermined level.

The middle tank (20) is mounted on top of the bottom tank (10) and has an opening (200) defined in a bottom plate (21) of the middle tank (20), a filtering box (22) mounted on top of the opening (200) to block the opening (200), a collecting pipe (23) mounted on top of the filtering box (22) and having an inlet (231) defined away from the filtering box (22), a receiving box (24) mounted on an outer periphery of the collecting pipe (23) and having a second pipe (241) extending out of the middle tank (20), a lid (25) mounted on top of the collecting pipe (23) to cover the inlet (231) of the collecting pipe (23) and a funnel (26) in communication with the lid (25) via a conduit (27) having a valve (271) mounted therein to control the communication between the funnel (26) and the lid (25).

The top tank (30) is provided with a bottom (31) having a through hole (300) defined therethrough, a filtering plate (32) mounted on top of the bottom (31) to cover the through hole (300) and having multiple apertures (33) defined through the filtering plate (32), a top board (40) mounted on top of the top tank (30) to cover the top tank (30), an illuminating device (50) to illuminate the top tank (30) and a feeding device (60) mounted on top of the top board (40) to supply food to the fish in the top tank (30).

When the aquarium of the present invention is in application, the organic waste from the fish or the microorganisms in the water in the top tank (30) will exit via the apertures (33) in the bottom (31) of the top tank (30) and are collected by the funnel (26). By means of the opening of the valve (271) of the conduit (27), the organic waste originally collected by the funnel (26) is flushed through the lid, the inlet (231) of the collecting pipe and delivered to the filtering box (22). Those waste materials not going through the inlet of the collecting pipe (23) will be collected by the receiving box (24). After going through the filtering process in the filtering box (22), clean water again flows to the bottom tank (10) for reuse. The contaminants collected by the filtering box (22) will be cleaned later and those contaminants trapped by the receiving box (24) are then drained out of the middle tank (20) via the second pipe (241).

Furthermore, a ball actuator (35) is provided in the top tank (30) so that the ball actuator (35) is able to maintain an appropriate water level inside the top tank (30) via a third pipe (34) which is connected to a water source. A second drainage pipe (36) is also provided to the top tank (30) so that when excess water enters the top tank (30) from the first pipe (12), the second drainage pipe (36) is able to maintain that the water level in the top tank (30) is fixed.

Figure 2:
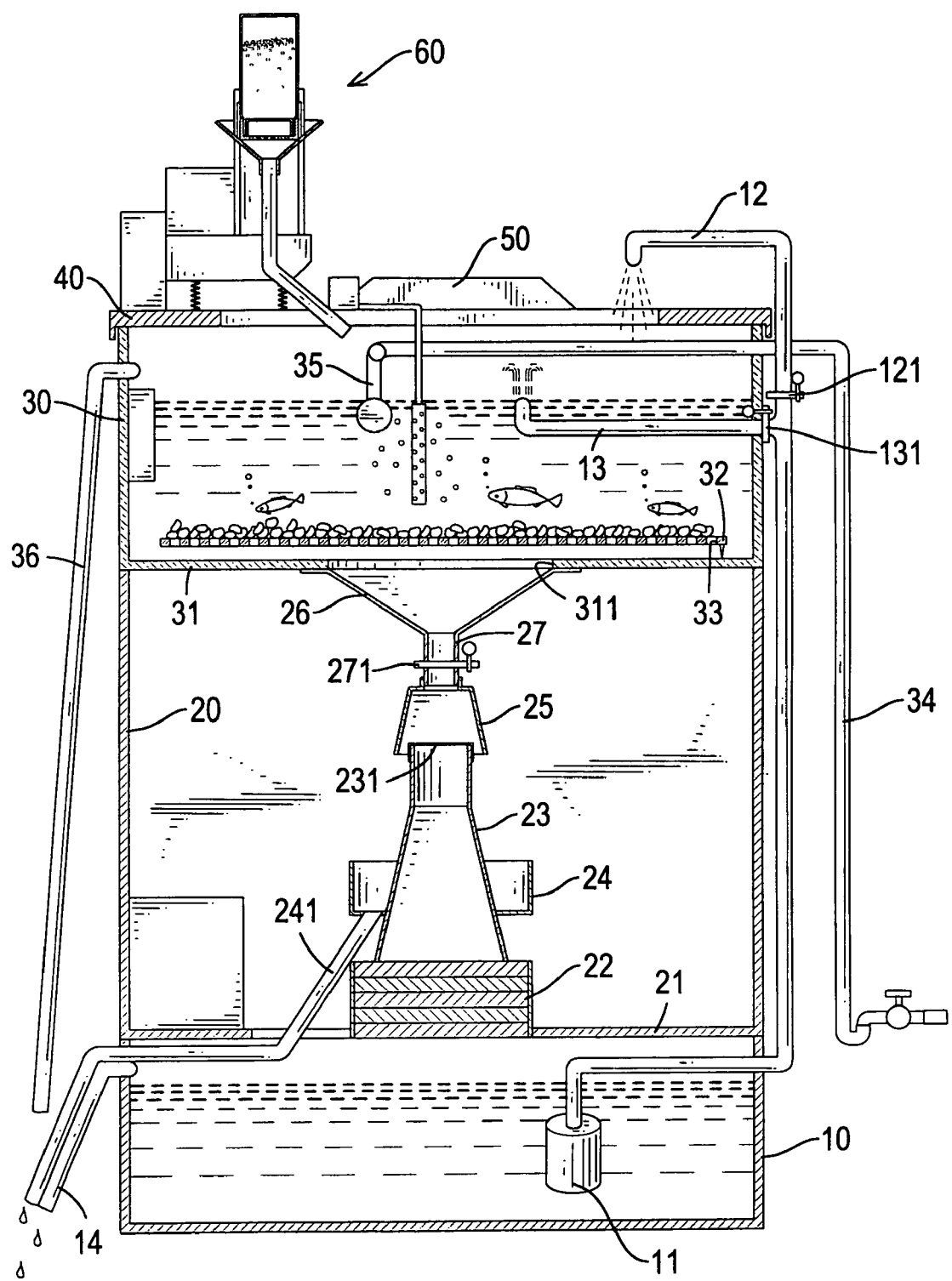
FIG. 2 is a schematic side plan view showing a different embodiment of the present invention.

With reference to FIG. 2, it is noted that the first pipe (12) may have a manifold (13) in communication with the first pipe (12). The first pipe (12) may have a first valve (121) and the manifold (13) may have a second valve (131) so that the user has a choice to allow water to flow directly from atop of the top tank (30) or to below the surface of the water in the top tank (30).

Figure 3:
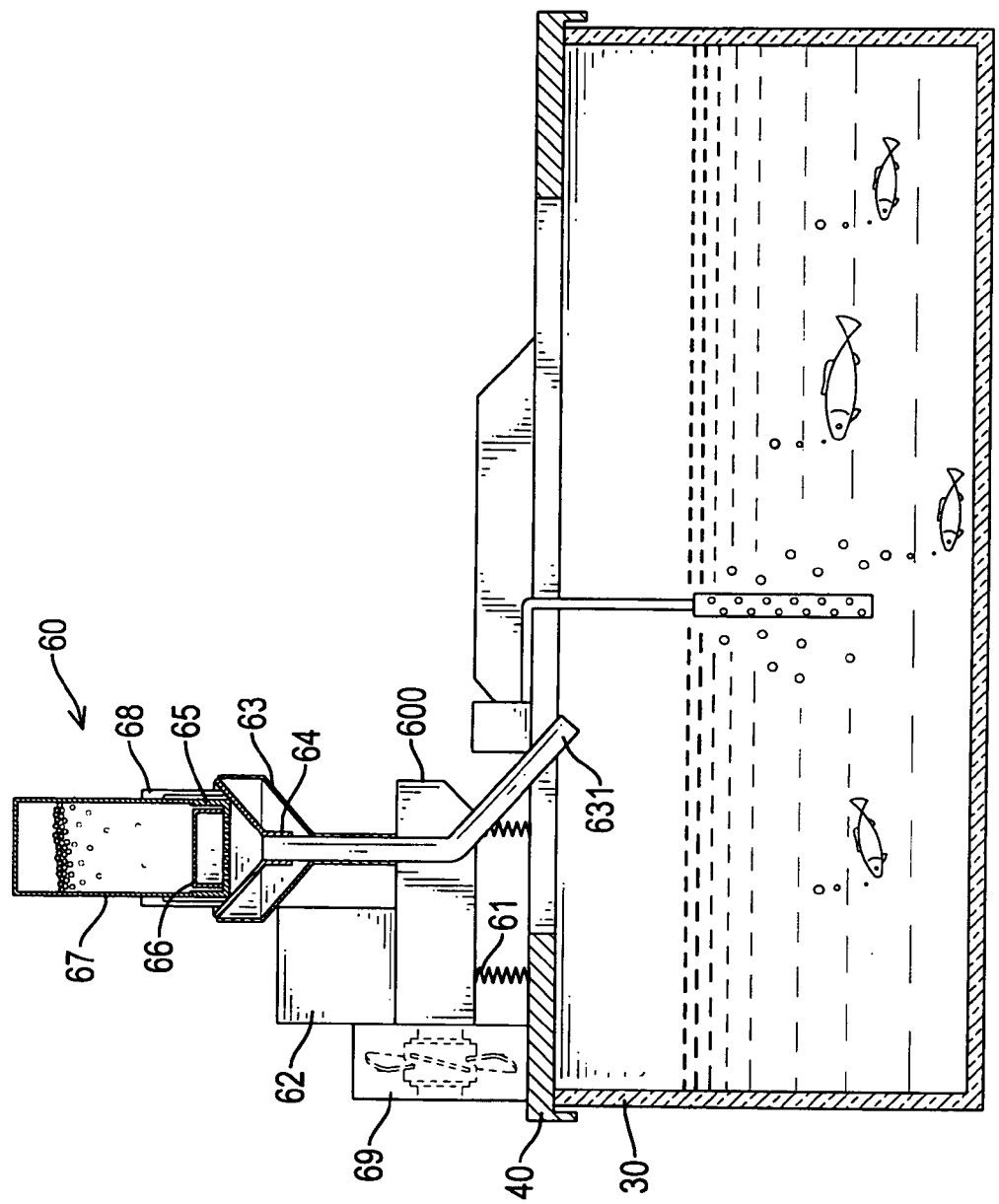
FIG. 3 is a schematic view showing that a food feeding device is mounted on top of the top tank of the present invention.
Figure 4:
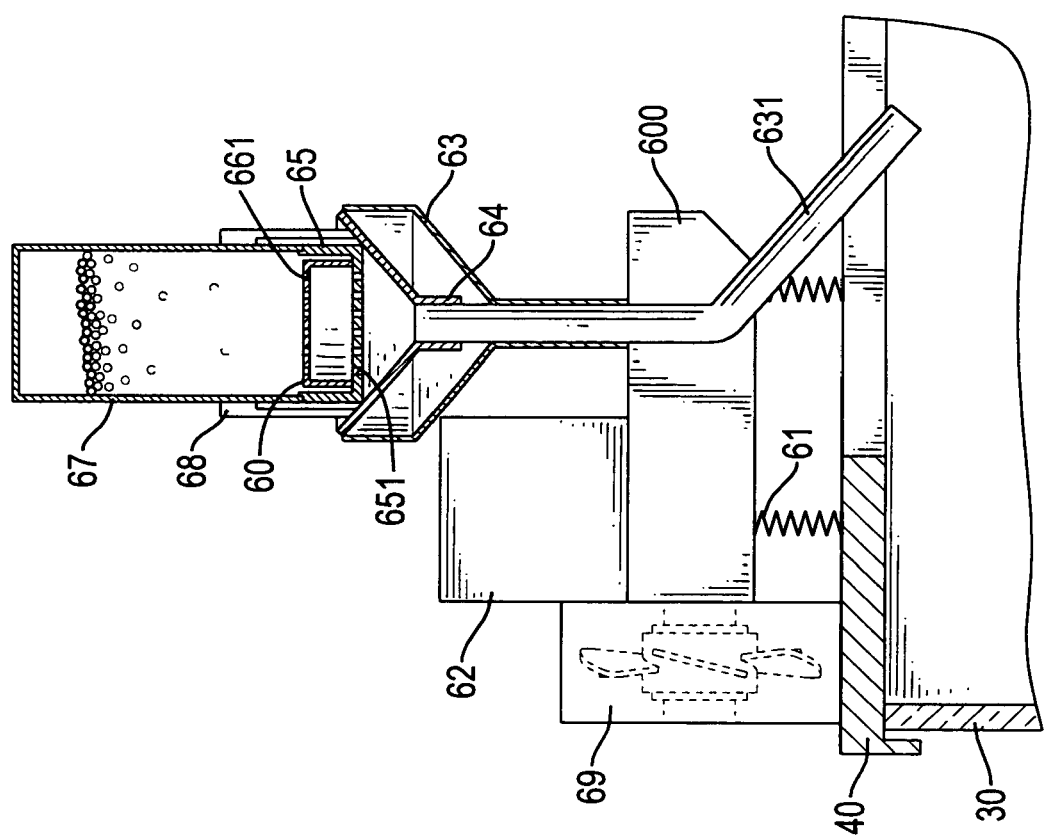
FIG. 4 is an enlarged schematic view showing the food feeding device of the present invention.

With reference to FIG. 3, the feeding device (60) is mounted on top of the top board (40) and has a base (600) securely connected to a top face of the top board (40) via at least one spring (61), a vibrator (62) mounted on top of the base (600) to vibrate the base (600), a support (63) having a dispersing pipe (631) extending through the base (600) and into the top tank (30), a second funnel (64) mounted on top of the support (63) to have communication with the dispersing pipe (631), a first bowl (65) mounted on top of the second funnel (64) and having multiple first apertures (651) defined through a bottom of the first bowl (65) to communicate with the second funnel (64), a second bowl (66) mounted on top of the first bowl (65) and having multiple second apertures (661) defined through a top face of the second bowl (66) to communicate with the first apertures (651) of the first bowl (65) and a food container (67) mounted on top of the second bowl (66) for receiving therein food. The food container (67) has an opening defined to communicate with the second apertures (661) of the second bowl (66). A clamp (68) is provided on a side of the food container (67) to secure the food container (67). A fan (69) is provided on a side of the vibrator (62) to help dissipate heat of the vibrator (62).

When the vibrator (62) is actuated, the base (600) is driven to vibrate. Due to the at least one spring (61) under the base (600), the food container (67), the first bowl (65) and the second bowl (66) are also vibrated. Because the food container (67) is in communication with the second bowl (66) via the second apertures (661) and the first bowl (65) via the first apertures (651), food such as grains or the like is able to be shaken to fall through the second apertures (661), the first apertures (651) and to the dispersing pipe (631). Eventually the food falls into the top tank (30). Because the vibration frequency and strength of the vibrator (62) is programmable, the quantity of food falling to the dispersing pipe (631) is able to be determined previously. Thus the user is able to control the food quantity to be scattered in the top tank (30).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An aquarium comprising:
a bottom tank which has a pump provided therein so that water in the bottom tank is able to be pumped upward to the top tank via a first pipe and water flowing out of the first pipe and splashing into the top tank is able to increase aeration of the water in the top tank, the bottom tank has a first drainage pipe provided on top of the bottom tank to maintain a water level in the bottom tank at a predetermined level;
a middle tank which is mounted on top of the bottom tank and has an opening defined in a bottom plate of the middle tank, a filtering box mounted on top of the opening to block the opening, a collecting pipe mounted on top of the filtering box and having an inlet defined away from the filtering box, a receiving box mounted on an outer periphery of the collecting pipe and having a second pipe extending out of the middle tank, a lid mounted on top of the collecting pipe to cover the inlet of the collecting pipe and a funnel in communication with the lid via a conduit having a valve mounted therein to control the communication between the funnel and the lid;
a top tank which is provided with a bottom having a through hole defined therethrough, a filtering plate mounted on top of the bottom to cover the through hole and having multiple apertures defined through the filtering plate, a top board mounted on top of the top tank to cover the top tank, an illuminating device to illuminate the top tank and a feeding device mounted on top of the top board for distributing food to fish in the top tank.

2. The aquarium as claimed in claim 1, wherein the first pipe has a first valve and a manifold having a second valve and extending directly to the top tank is in communication with the first pipe.

3. The aquarium as claimed in claim 2, wherein the feeding device comprises:
a base securely connected to a top face of the top board via at least one spring;
a vibrator mounted on top of the base to vibrate the base;
a support having a dispersing pipe extending through the base and into the top tank;
a second funnel mounted on top of the support to have communication with the dispersing pipe;
a first bowl mounted on top of the second funnel and having multiple first apertures defined through a bottom of the first bowl to communicate with the second funnel;
a second bowl mounted on top of the first bowl and having multiple second apertures defined through a top face of the second bowl to communicate with the first apertures of the first bowl; and
a food container mounted on top of the second bowl for receiving therein food, the food container having an opening defined to communicate with the second apertures of the second bowl, wherein a clamp is provided on a side of the food container to secure the food container.

4. The aquarium as claimed in claim 3, wherein a fan is provided on a side of the vibrator to help dissipate heat of the vibrator.

* * * * *